US012632593B2

(12) United States Patent
Bhatia et al.

(10) Patent No.: US 12,632,593 B2
(45) Date of Patent: May 19, 2026

(54) DIFFERENTIAL NOISE FOR LONG-TERM PRIVACY AND SHORT-TERM PRIVACY PRESERVATION

(71) Applicant: QUALCOMM Incorporated, San Diego, CA (US)

(72) Inventors: Ashok Bhatia, San Diego, CA (US); Paul Torres, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 18/528,555

(22) Filed: Dec. 4, 2023

(65) Prior Publication Data

US 2025/0181757 A1     Jun. 5, 2025

(51) Int. Cl.
| *G06F 15/173* | (2006.01) |
| *G06F 11/34* | (2006.01) |
| *G06F 21/62* | (2013.01) |

(52) U.S. Cl.
CPC ...... *G06F 21/6245* (2013.01); *G06F 11/3438* (2013.01)

(58) Field of Classification Search
CPC ............. G06F 21/6245; G06F 11/3476; H04L 47/2416; H04L 63/0435
See application file for complete search history.

(56) References Cited

U.S. PATENT DOCUMENTS

| 10,795,999 | B1 | 10/2020 | Gursoy et al. |
| 2008/0192753 | A1* | 8/2008 | Li ........................ H04L 47/2416 |
| | | | 370/395.21 |
| 2022/0311822 | A1* | 9/2022 | Nord ................... H04L 63/0435 |
| 2023/0012736 | A1 | 1/2023 | Mani et al. |
| 2023/0273994 | A1* | 8/2023 | Mohammady ...... G06F 21/6245 |
| | | | 726/23 |
| 2024/0202370 | A1* | 6/2024 | Joshi ................... G06F 11/3476 |

OTHER PUBLICATIONS

International Search Report and Written Opinion—PCT/US2024/056746—ISA/EPO—Feb. 20, 2025.

* cited by examiner

*Primary Examiner* — Yves Dalencourt
(74) *Attorney, Agent, or Firm* — Polsinelli LLP

(57) ABSTRACT

Disclosed are systems, apparatuses, processes, and computer-readable media for protecting sensitive information with differential noise for long-term privacy and short-term privacy. For example, a computing device or system can detect, over a period of time, a plurality of events associated with a function of the computing device. The computing device can determine a first noise associated with the plurality of events over the period of time. The computing device can add the first noise and a second noise to a value corresponding to the plurality of events. The computing device can send a noisy report identifying a usage of the function to a device usage service, the noisy report including the value with the first noise and the second noise.

22 Claims, 10 Drawing Sheets

800 —

Detect, Over A Period Of Time, A Plurality Of Events Associated With A Function Of The Computing Device — 802

Determine A First Noise Associated With The Plurality Of Events Over The Period Of Time — 804

Adding The First Noise And A Second Noise To A Value Corresponding To The Plurality Of Events — 806

Send A Noisy Report Identifying A Usage Of The Function To A Device Usage Service, The Noisy Report Including The Value With The First Noise And The Second Noise — 808

420~

800 ⟶

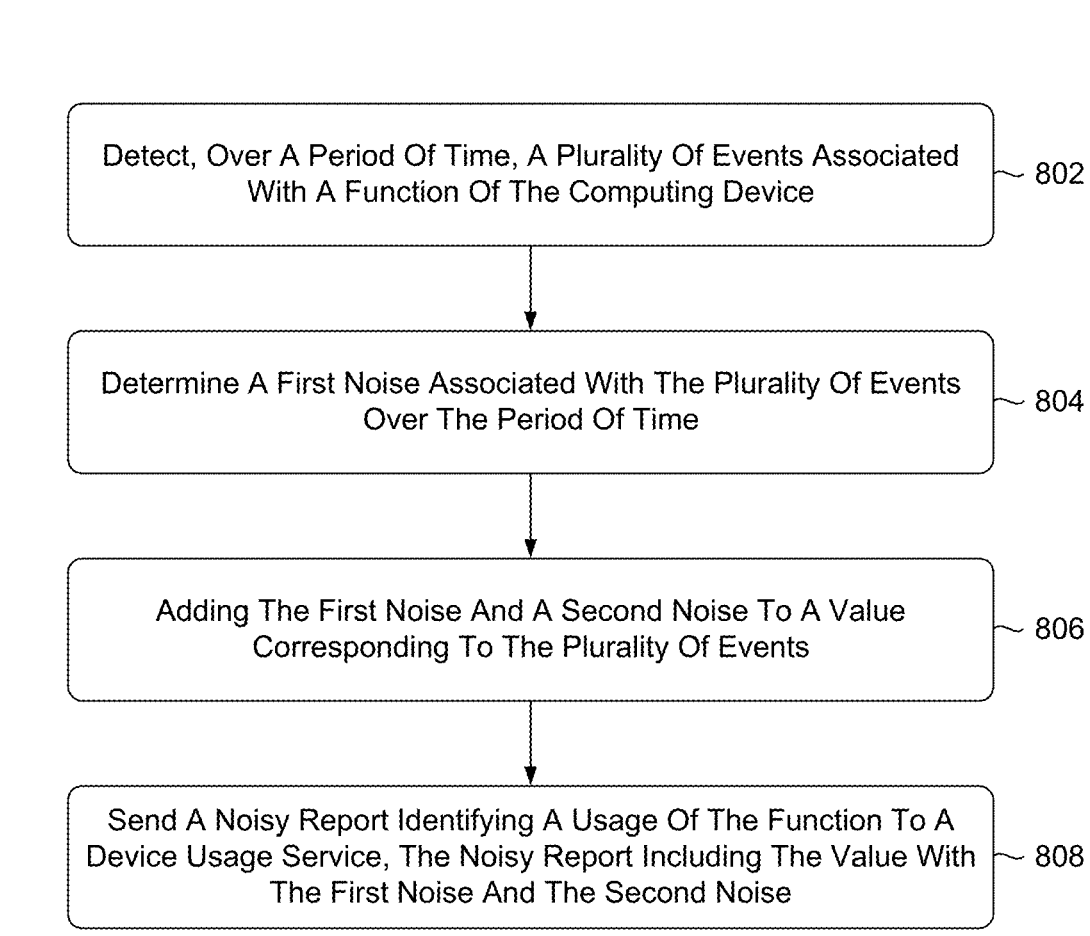

Detect, Over A Period Of Time, A Plurality Of Events Associated With A Function Of The Computing Device        ～ 802

Determine A First Noise Associated With The Plurality Of Events Over The Period Of Time        ～ 804

Adding The First Noise And A Second Noise To A Value Corresponding To The Plurality Of Events        ～ 806

Send A Noisy Report Identifying A Usage Of The Function To A Device Usage Service, The Noisy Report Including The Value With The First Noise And The Second Noise        ～ 808

Receive A First Plurality Of Reports From A Plurality Of Computing Devices ~ 902

Generate A First Noise Distribution Based On The First Plurality Of Reports ~ 904

Send The First Noise Distribution To The Plurality Of Computing Device ~ 906

Receive A Second Plurality Of Reports From The Plurality Of Computing Devices ~ 908

DIFFERENTIAL NOISE FOR LONG-TERM PRIVACY AND SHORT-TERM PRIVACY PRESERVATION

FIELD

The present disclosure generally relates to electronic devices and usage of features at electronic devices. For example, aspects of the present disclosure relate to systems and techniques for adding differential noise to data for long-term privacy and short-term privacy preservation.

BACKGROUND

Multimedia systems are widely deployed to provide various types of multimedia communication content such as voice, video, packet data, messaging, broadcast, and so on. These multimedia systems may be capable of processing, storage, generation, manipulation, and rendition of multimedia information. Examples of multimedia systems include mobile devices, game devices, entertainment systems, information systems, virtual reality systems, model and simulation systems, and so on. These systems may employ a combination of hardware and software technologies to support the processing, storage, generation, manipulation, and rendition of multimedia information, for example, client devices, capture devices, storage devices, communication networks, computer systems, and display devices.

SUMMARY

In some examples, systems, and techniques are described for electronic devices and usage of features at electronic devices. For example, the systems and techniques can be used for protecting sensitive information using differential noise for long-term privacy and short-term privacy.

According to at least one example, a method of reporting usage of a computing device includes: detecting, over a period of time, a plurality of events associated with a function of the computing device; determining a first noise associated with the plurality of events over the period of time; adding the first noise and a second noise to a value corresponding to the plurality of events; and sending a noisy report identifying a usage of the function to a device usage service, the noisy report including the value with the first noise and the second noise.

In another example, an apparatus for reporting usage of a computing device is provided that includes a memory and a processor (e.g., implemented in circuitry) coupled to the memory and configured to: detect, over a period of time, a plurality of events associated with a function of the computing device; determine a first noise associated with the plurality of events over the period of time; add the first noise and a second noise to a value corresponding to the plurality of events; and send a noisy report identifying a usage of the function to a device usage service, the noisy report including the value with the first noise and the second noise.

In another example, a non-transitory computer-readable medium is provided that has stored thereon instructions that, when executed by one or more processors, cause the one or more processors to: detect, over a period of time, a plurality of events associated with a function of the computing device; determine a first noise associated with the plurality of events over the period of time; add the first noise and a second noise to a value corresponding to the plurality of events; and send a noisy report identifying a usage of the function to a device usage service, the noisy report including the value with the first noise and the second noise.

In another example, an apparatus is provided that includes: means for detecting, over a period of time, a plurality of events associated with a function of the computing device; means for determining a first noise associated with the plurality of events over the period of time; means for adding the first noise and a second noise to a value corresponding to the plurality of events; and means for sending a noisy report identifying a usage of the function to a device usage service, the noisy report including the value with the first noise and the second noise.

In another example, a method is provided that includes: receiving a first plurality of reports from a plurality of computing devices, wherein the first plurality of reports include values identifying usage of a function at a corresponding computing device combined with a first random noise value generated at the corresponding computing device; generating a first noise distribution based on the first plurality of reports; sending the first noise distribution to the plurality of computing devices; and receiving a second plurality of reports from the plurality of computing devices, wherein the second plurality of reports include values identifying usage of the function at the corresponding computing device combined with a second random noise value generated at the corresponding computing device based on the first noise distribution.

In another example, an apparatus is provided that includes a memory and a processor (e.g., implemented in circuitry) coupled to the memory and configured to: receive a first plurality of reports from a plurality of computing devices, wherein the first plurality of reports include values identifying usage of a function at a corresponding computing device combined with a first random noise value generated at the corresponding computing device; generate a first noise distribution based on the first plurality of reports; send the first noise distribution to the plurality of computing devices; and receive a second plurality of reports from the plurality of computing devices, wherein the second plurality of reports include values identifying usage of the function at the corresponding computing device combined with a second random noise value generated at the corresponding computing device based on the first noise distribution.

In another example, a non-transitory computer-readable medium is provided that has stored thereon instructions that, when executed by one or more processors, cause the one or more processors to: receive a first plurality of reports from a plurality of computing devices, wherein the first plurality of reports include values identifying usage of a function at a corresponding computing device combined with a first random noise value generated at the corresponding computing device; generate a first noise distribution based on the first plurality of reports; send the first noise distribution to the plurality of computing devices; and receive a second plurality of reports from the plurality of computing devices, wherein the second plurality of reports include values identifying usage of the function at the corresponding computing device combined with a second random noise value generated at the corresponding computing device based on the first noise distribution.

In another example, an apparatus is provided that includes: means for receiving a first plurality of reports from a plurality of computing devices, wherein the first plurality of reports include values identifying usage of a function at a corresponding computing device combined with a first random noise value generated at the corresponding computing device; means for generating a first noise distribution based on the first plurality of reports; means for sending the first noise distribution to the plurality of computing devices; and means for receiving a second plurality of reports from the plurality of computing devices, wherein the second plurality of reports include values identifying usage of the function at the corresponding computing device combined with a second random noise value generated at the corresponding computing device based on the first noise distribution.

In some aspects, one or more of apparatuses described herein is, is part of, and/or includes a wearable device, a wireless communication device, a mobile device (e.g., a mobile telephone and/or mobile handset and/or so-called "smartphone" or another mobile device), an extended reality (XR) device (e.g., a virtual reality (VR) device, an augmented reality (AR) device, or a mixed reality (MR) device, such as a head-mounted device (HMD) device), a vehicle or a computing device, system, or component of the vehicle, a camera, a personal computer, a laptop computer, a server computer, a television (e.g., a network-connected television), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes and/or gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 8 is a flowchart illustrating an example method for protecting privacy in long duration trends and short duration trends, in accordance with aspects of the present disclosure;

DETAILED DESCRIPTION

Figure 1:
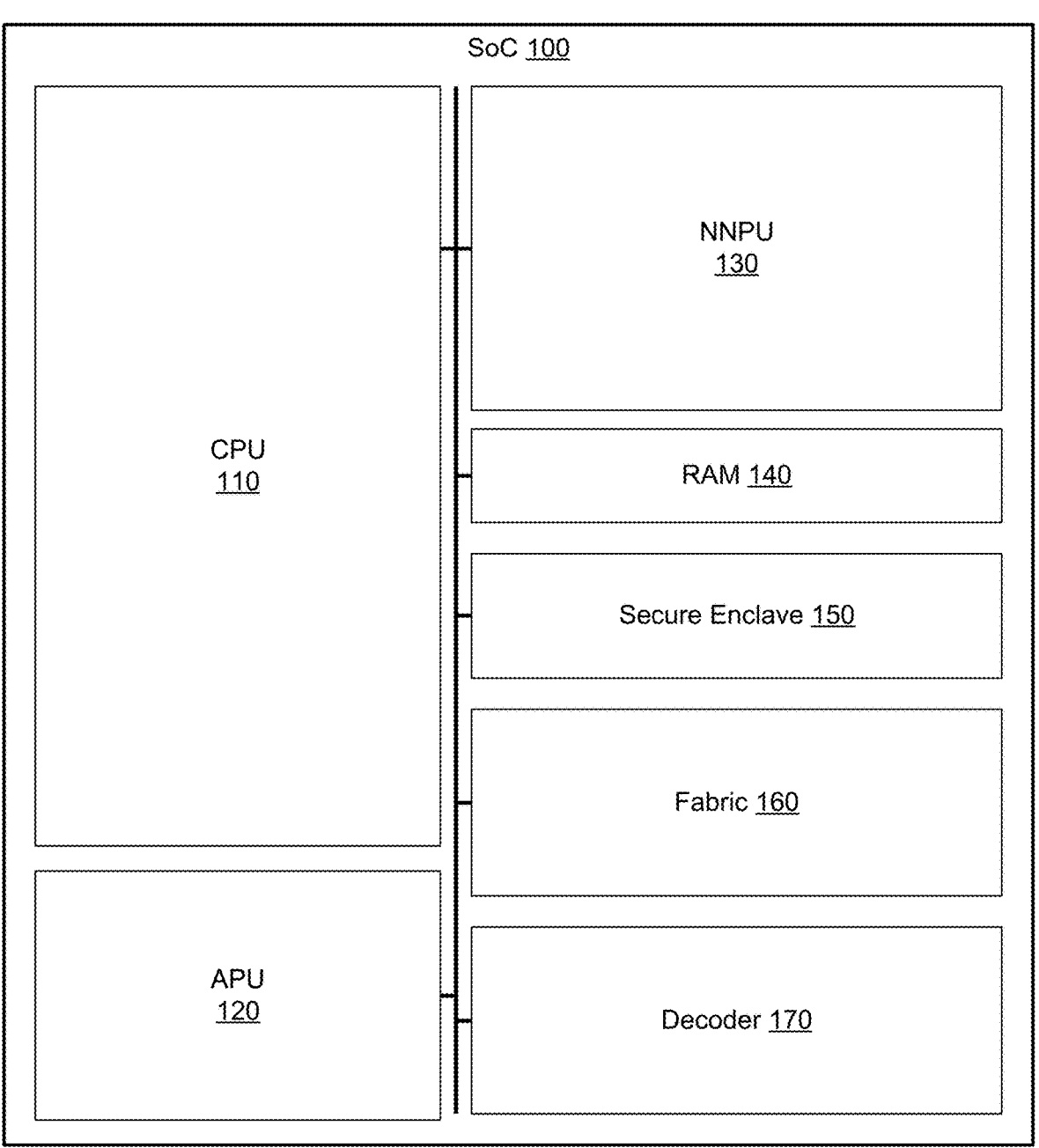
FIG. 1. is a block diagram of an example system on chip (SoC), in accordance with some aspects of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices including mobile devices have become a common part of modern life, serving as versatile tools for communication, entertainment, and productivity. Electronic devices combine multiple functions to perform a combination of generic and/or specific functions. In this case, a specific function is an operation that the electronic device is specifically configured for, such as a mobile device that is configured to perform voice communications. Another example of a specific function is a digital media player that is configured to display multimedia content through display that is statically positioned in a person's home. Generic functions are combined into the electronic devices to complement the specific functions. For example, an extended reality (XR) device may include various wireless connectivity options for connecting wireless sensors to the XR device.

There are many factors that go into designing electronic products. Forecasting of device usage is difficult because technology changes how users interact with their devices. Device manufacturers have an interest in collecting usage information from their products for a variety of reasons. Usage information data provides important insights into how users interact with their devices. By analyzing usage information and identifying usage patterns, device manufacturers can identify popular features, underutilized features, and identify potential usability issues in their devices. The feedback provided by the usage information allows device manufacturers to make informed decisions for future iterations and provide devices to better meet customer needs and preferences.

Usage information can be used by device manufacturers to optimize performance and reliability. For instance, usage information can be mapped to identify utilization of features available within a device or a component of a device, such as a system on chip (SoC). For example, an SoC integrates different processing cores such as a graphics processing unit (GPU), digital signal processor (DSP), neural network processing unit (NNPU), and a video decoder. The SoC can integrate different components depending on the intended functionality of the device manufacturer. For example, a network hardware manufacturer can include a network processing unit (NPU) for processing network packets at the hardware level. The usage information can be used to identify the importance of the processing capabilities and how users are interacting with different functions of their devices. This allows device manufacturers to prioritize different components based on the usage of their devices. Device manufacturers can also analyze the usage information to detect potential glitches, software bugs, or hardware weaknesses. Usage information is also helpful to device manufacturers, such as to prioritize power consumption and optimize features and functions.

Sharing usage information may cause concerns related to privacy, security, and the potential misuse of personal data. For example, users are cautious about sharing sensitive details about their habits and behaviors, and may want to keep their usage data (e.g., how and when they use a device, how and when they consume data, etc.) private. Further, data breaches are common and can expose private information. The fear of their data falling into the wrong hands and being exploited for nefarious purposes, such as identity theft, creates a substantial barrier to freely sharing usage information. Awareness of surveillance and data tracking practices has led to a desire for greater control over personal information and increasingly caused users to resist contributing usage information data to device manufacturers.

Differential privacy is a technique for sharing aggregate information derived from sensitive datasets while safeguarding sensitive user information and specific details of the individuals within that data. Differential privacy introduces noise or other randomness into information and prevents any single data point from unduly influencing the outcomes. However, if naively used, differential privacy may not protect all data and, with many queries of the data, usage information could potentially be identified. For example, when the data for a user is available for a long period of time (e.g., time series data) differential privacy protects short-term information by introducing randomness, but the noise could be canceled out in a long-term analysis, revealing long term user activity patterns.

Systems, apparatuses, processes (also referred to as methods), and computer-readable media (collectively referred to as "systems and techniques") are described herein that add differential noise to data for long-term privacy and short-term privacy. For example, the systems and techniques can detect, over a period of time, a plurality of events associated with a function of a computing device. The plurality of events correspond to usage information and can be used to identify short-term trends and long-term trends of the user. A computing device can add a first noise and a second noise to a value corresponding to the plurality of events. The first noise may be associated with a first noise distribution and the second noise may be associated with the second noise distribution. The first noise distribution and the second noise distribution should be independent of each other and configured to obscure long-term trends and short-term trends in the usage information.

In some aspects, the systems and techniques utilize a first noise source as a source of the first noise (e.g., the first noise distribution) for application to usage information or data and a second noise source as a source of the second noise (e.g., the second noise distribution) for application to the usage information or data. For example, the first noise source can generate a new random variable each time a new sample is reported from a usage counter. In that sense, the random variables generated from the first noise source are uncorrelated to other samples generated from the first noise source. For example, the first noise source can generate a different random number independently, and thus at every instance of the usage counter report, the noise is uncorrelated noise.

The first noise protects the short-term trends in user behavior patterns. For example, if a user captures four pictures per day, but on a specific day takes twenty pictures, the detection of such a short-term behavioral shift will be protected due to the additive noise from the first noise source.

The second noise source is configured to generate the second noise that is also applied to usage information. The second noise can be randomly generated and is persistent over longer periods of time. For example, with the exception of an initialization interval (e.g., a first interval 510 illustrated in FIG. 5), the second noise source may always generate a same number, which is randomly generated after the initialization interval, and after that, the noise may remain fixed or unchanged for a long duration of time (e.g., for an entire time duration of data collection from the device). In some aspects, there may be other variations of the second noise source. For example, instead of generating the same number and using the number for the long duration of time, the second noise source can generate a series of random numbers that may be auto-correlated (e.g., highly auto-correlated).

When viewed from the perspective of the data generated by a single user device over time, the second noise source is thus highly correlated. However, when observed over multiple different user devices, the second noise generated by the second noise source will be uncorrelated (as the second noise sources at the different user devices are essentially independent random number generators running on the different user devices) and the generated random numbers may not be shared (e.g., in some cases are never shared) outside of the single device.

The second noise protects the long-term trends of the user device. For example, if the user takes twenty pictures per day, which is different from a median usage of a crowd of users (e.g., the median usage of the crowd of users if five pictures per day), the difference in usage of the user from the crowd will be protected since there is plausible deniability introduced by the second noise source (e.g., it is the contribution from the second noise source that is causing the reported data from the user's device to be higher than the median). In some aspects, the second noise source generates random variables that mimic the behavior of the crowd and can generate random variables that mimic the behavior after learning of the crowd distribution during the initialization interval (e.g., the first interval 510 illustrated in FIG. 5).

Additional aspects of the present disclosure are described in more detail below.

FIG. 1. is a block diagram of an example SoC 100 in accordance with some aspects of the disclosure. In some aspects, an SoC 100 is a semiconductor device that is manufactured and configured to include various components to integrate functions within the SoC to reduce delays associated with external interfaces and other impediments. For example, high-bandwidth video functions such as augmented and virtual reality may exceed the bandwidth of a double data rate (DDR) bus.

In one aspect, the SoC 100 may include at least one central processing unit (CPU) 110 or a processing core configured to execute software instructions. In some aspects, the CPU 110 comprises a plurality of processing cores that may be configured to execute the functionality in parallel, and the processing cores may have different configurations. For example, the CPU 110 may include a plurality of performance cores for low-latency functions and a plurality of efficiency cores that consume less power than the performance cores.

The SoC 100 may also include one or more accelerated processing units (APU) 120 that are configured to perform specific functions, such as floating-point math. Non-limiting examples of APU functions include a DSP for floating point mathematical operations, a networking processing unit, and other devices. The NPU may be programmable using the programming protocol-independent packet processors (P4) language, which is a domain-specific programming language for network devices for processing packets. For example, a network processing unit may be implemented in a SoC of a network hardware device. In some aspects, a network processing unit in the APU may have a distributed P4 NPU architecture that may execute at line rate for small packets with complex processing, and may also include optimized and shared NPU fungible tables.

In some aspects, the SoC 100 may also include programmable logic devices such as an NNPU 130. The NNPU 130 may be integral to the APU 120 in some cases. In this case, the NNPU 130 is illustrated as separate from the APU 120 due to the bandwidth limitations of the bus. For example, memory operations of the NNPU 130 may be slowed based on sharing a bus interface based on other components. The NNPU 130 may be configured to prioritize matrix and floating-point operations that are associated with neural network operations. For example, the training of a neural network requires many operations across, in some cases, billions of different parameters to identify a local minima and reduce the loss.

In some aspects, the SoC 100 may also include a volatile memory such as a random access memory (RAM) 140 that is shared between the various components (e.g., CPU 110, APU 120, NNPU 130, etc.). As an example, a GPU (e.g., implemented in the APU 120), the CPU 110, and the NNPU 130 may share access to the RAM 140.

The SoC 100 may also include a secure enclave 150 such as a trusted platform module (TPM) or a trusted anchor module (TAM) that is configured to secure the SoC 100 and identify any malicious issues. The secure enclave may include encryption generation functionality, a true random number generator, a secure storage medium, and so forth. In some cases, the SoC 100 may also be configured to interface with a security sub-system (not shown), such as a security module that is configured to securely store information that is not made available to the SoC 100. In one aspect, the security sub-system may securely store biometric information to enable various functions such as biometric authentication, etc.

The SoC 100 also includes a fabric 160 that is configured to facilitate interfacing the components of the SoC 100 internally and externally. As an example, the fabric 160 may include functionality to allocate the RAM 140 between the various shared components within the SoC 100. The SoC 100 may interconnect the various components using a bus to enable access to the various components, such as enabling the CPU 110 to address a portion of the RAM 140. In some aspects, the fabric 160 may also interface with external components such as a security sub-system, various bus interfaces (e.g., Peripheral Component Interconnect Express (PCI-e), thunderbolt, universal serial bus, a communication circuit for wireless communication, an Ethernet networking module, and so forth).

In some cases, the SoC may also include a video decoder 170 for decoding one or more formats of video (e.g., H.264, H.265, etc.). In this case, the video decoder 170 is configured to receive a video file and perform various functions to decompress, decode, and generate a plurality of video frames to be output from the SoC 100. The video decoder 170 is a hardware circuit and may implement video decoding associated with one or more video formats (e.g., H.264, H.265, etc.) and converts each compressed frame of the video into an uncompressed frame with minimal loss. As compared to software-based decoding, hardware decoding requires less power consumption and memory requirements because of the additional operations to decode instructions, various memory operations for storing frames and pixels, and so forth. For example, the video decoder 170 may not need to store a decoded frame in memory and may include a hardware buffer for storing decoded frames and outputting the frames at the correct time without requiring the hardware processor to perform any additional operations.

In some aspects, a device can be configured to provide usage information of a device or a component of the device (e.g., the SoC 100) to a manufacturer of the device. For instance, as noted above, an SoC may have different processing cores that have different functions, and each processing core consumes space. Space is limited within the SoC and a device manufacturer may use the usage information to determine long-term trends related to SoC utilization. For example, advances in generative neural networks that create various types of text and media have increased in popularity and NNPU processing cores are being utilized at greater rates. As the utilization of neural networks increases, a device manufacturer may prioritize space for an NNPU over other processing cores. The usage information can assist a device manufacturer in objective information that improves the user experience.

Figure 2A:
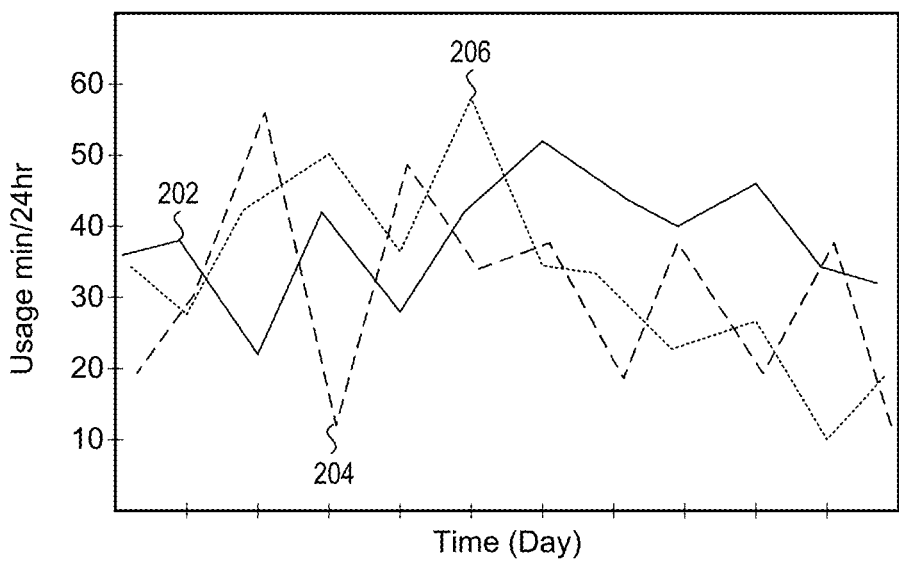
FIG. 2A illustrates an example of differential privacy applied to usage information over a short-term period, in accordance with some aspects of the disclosure.

FIG. 2A illustrates an example of differential privacy applied to usage information over a short-term period in accordance with some aspects of the disclosure. In some aspects, the usage information is any information associated with the usage of a computing device that can be used to identify relevant information including long-term trends and short-term trends associated with the user. In other aspects, differential privacy may also be applied to other types of information, such as sensitive user information. As noted above, differential privacy introduces noise or other randomness into the usage information and prevents any single data point from unduly influencing the outcomes. Some aspects described herein relate to local differential privacy or a hybrid differential privacy. Local differential privacy includes applying noise to local data at the user device before being provided to a service (e.g., a usage server) that uses the usage information for various purposes. Hybrid differential privacy includes applying noise to usage information at the user device and the usage service. Local and hybrid differential privacy are distinct from differential privacy techniques that apply the noise to the usage information at query-time because, in the event of data leakage to malicious actors, the usage information is altered by at least one noise and true values of trends cannot be discerned.

In some aspects, usage information includes any relevant metric associated with functions of the device over a period of time (e.g., an interval). For example, the usage information is related to the time consumed by a particular game on a mobile device on a daily basis (e.g., 30 minutes per day). In another example, the usage information may be the length of time consumed watching video at a digital media player (e.g., Apple TV®, etc.), the length of time a user listened to audio from a smart speaker, the number of images captured with a camera, and so forth. In some cases, the usage information can be related to the number of uses of a processing core of an SoC. For example, each time an NNPU is invoked to perform an operation, a value associated with the NNPU is incremented. In other cases, usage information can also include usage amount over a unit of time (e.g., 3 minutes per hour or 0.05% per hour), power consumption per unit of time, and so forth.

A short-term period is relative to the time unit associated with the usage information. In the example illustrated in FIG. 2A, the time unit of the usage information corresponds to a 24-hour interval and represents usage information over 10 days. In some aspects, short-term trends are associated with abnormal behavior of the computing device. For example, when a person goes on vacation, the number of images captured by the computing device may increase as compared to normal behavior.

A long-term period represents normal behavior and can identify habits associated with the person. For example, the average behavior of the person can be discerned to identify normal behavior patterns of the person, such as the average time playing a game, watching multimedia, or participating in social media.

In some aspects, by adding noise to the usage information, the usage information can be transformed into protected usage information. Differential privacy uses a random number generator (RNG), such as an RNG in a TPM module, or some other device-independent component to generate a truly random number. In some aspects, the usage information is modified to introduce artifacts (e.g., noise represented by the random number) to obscure the true behavior of the user of the computing device. In one case, the truly random number may be scaled by a factor that introduces randomness into the usage information. For example, the usage information may be related to the length of time (e.g., a duration) that the user was playing a game. In this example, the truly random number should have enough scale to have a meaningful impact on the length of the period to obscure the actual time. In the case of a game, the truly random number can have a range of −2 hours to +2 hours.

The truly random number is added to the usage information to generate protected usage information. For example, in FIG. 2A, protected usage information 202 of a first person, protected usage information 204 of a second person, and protected usage information 206 of a third person are generated for a short-term period. As shown in FIG. 2A, no meaningful information or trends can be discerned for the first person, the second person, or the third person can be obtained because each individual data point has a random noise introduced.

Figure 2B:
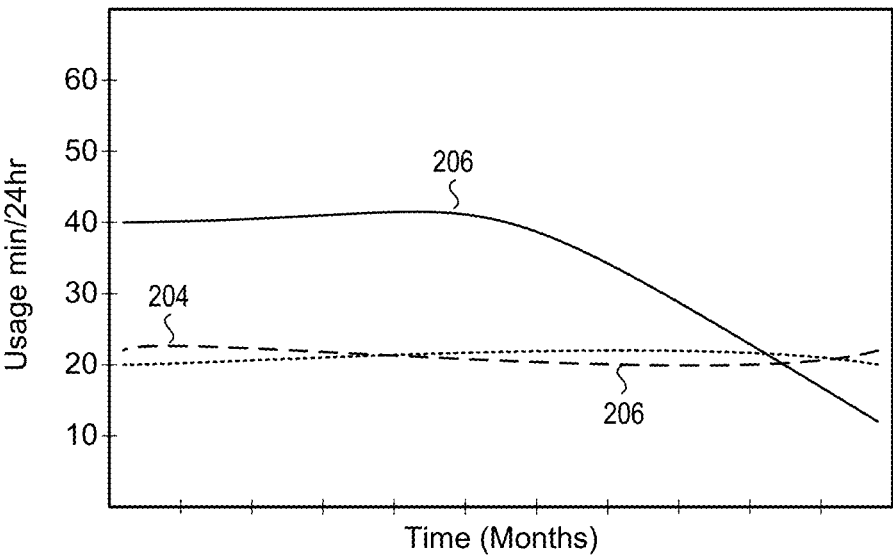
FIG. 2B illustrates an example of differential privacy applied to usage information over a long-term period, in accordance with some aspects of the disclosure.

FIG. 2B illustrates an example of differential privacy applied to usage information over a long-term period in accordance with some aspects of the disclosure. In this case, the protected usage information 212 of the first person, the protected usage information 214 of the second person, and the protected usage information 216 of the third person is generated and smoothed based on a running average. In this case, the truly random number cancels out over time and an average usage of a function can be readily discerned. In the case of a game, the first person and the second person play approximately 20 minutes of a particular game over a day for the 10-month period, and the third person plays approximately 40 minutes of a particular game. The third person decreases their game-playing consumption begins after approximately 5 months.

The user's actual usage information is represented by $T_a$ and is modified by a random noise $\epsilon_j$ to yield privacy information $T_r$ in Equation 1 below.

$$T_r = T_a + \epsilon_i \qquad \text{(Equation 1)}$$

However, the long-term usage information collected every day over a period of time is represented by Equation 2 below.

$$\sum T_r = \sum T_a + \sum \epsilon_i \qquad \text{(Equation 2)}$$

In this case, the noise is a random variable from the same distribution (e.g., an RNG in the computing device), and the sum of the random noise $\epsilon_i$ converges on a mean of the noise distribution, which results in Equation 3 for a zero mean noise. For a non-zero mean noise, the mean can be subtracted out as the mean is readily known providing Equation 3.

$$\sum T_r = \sum T_a \qquad \text{(Equation 3)}$$

In this case, differential privacy will ambiguate usage information and protect short-term privacy but will not protect against identification of long-term period terms, or normal behavior. For example, differential privacy protects identification of normal daily information, such as the amount of time that an individual watches media. However, differential privacy does not protect identification of trends based on a statistical analysis of that protected usage information. In this case, the mean of the usage information can be readily identified as illustrated in FIG. 2B when applying a random noise for each instance of usage information.

Figure 2C:
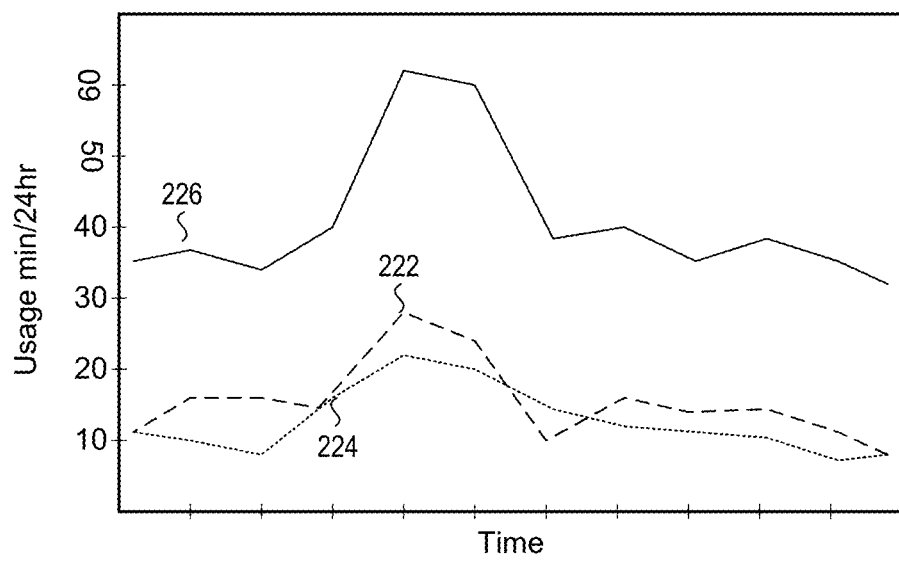
FIG. 2C illustrates another example of differential privacy applied to usage information over a short-term period, in accordance with some aspects of the disclosure.

FIG. 2C illustrates another example of differential privacy applied to usage information over a long-term period in accordance with some aspects of the disclosure. In some cases, another potential technique is to apply a fixed or static noise to the usage information. For example, FIG. 2C illustrates adding a static noise to each instance of the usage information to disambiguate long-term. This technique will shift the average value by the random noise as shown in FIG. 2A.

In this case, the protected usage information 232 of the first person, the protected usage information 234 of the second person, and the protected usage information 236 of the third person are generated based on a fixed noise (e.g., fixed for a single user, but random with respect to other users) that is applied to each sample of usage data. In the case described in FIG. 2C, the same fixed noise is added to each usage information over a long-term duration to obscure a median trend of a user. In this case, the average value may not be discerned because each value is offset by the same noise, which can be positive or negative.

As shown in FIG. 2C, the long-term trend information is protected based on using the fixed noise. The fixed noise is not known and the true value of the usage information cannot be discerned. However, by adding the same fixed noise every day, deviations of the non-average days are easily discerned and short-term trends can be easily identified.

In some aspects, usage information can also be protected based on applying two different noises that use independent noise distributions. Non-limiting examples of two different noises include a random noise distribution selection, and weighted random variables.

A random noise distribution selection is also referred to as a coin flip-based selection and randomly selects two different noises. For example, the random noise distribution selection may include a fixed noise and a dynamic noise. The fixed noise is a single random noise $L_p$ that does not change and the dynamic noise is a dynamic random noise $L_{vi}$ that changes on every selection. For example, usage information may be protected by randomly selecting between adding either the first noise $L_p$ or the dynamic random noise $L_{vi}$ to the usage information. The weighted random variables are further discussed below in the privacy generation system 300 of FIG. 3.

Figure 3:
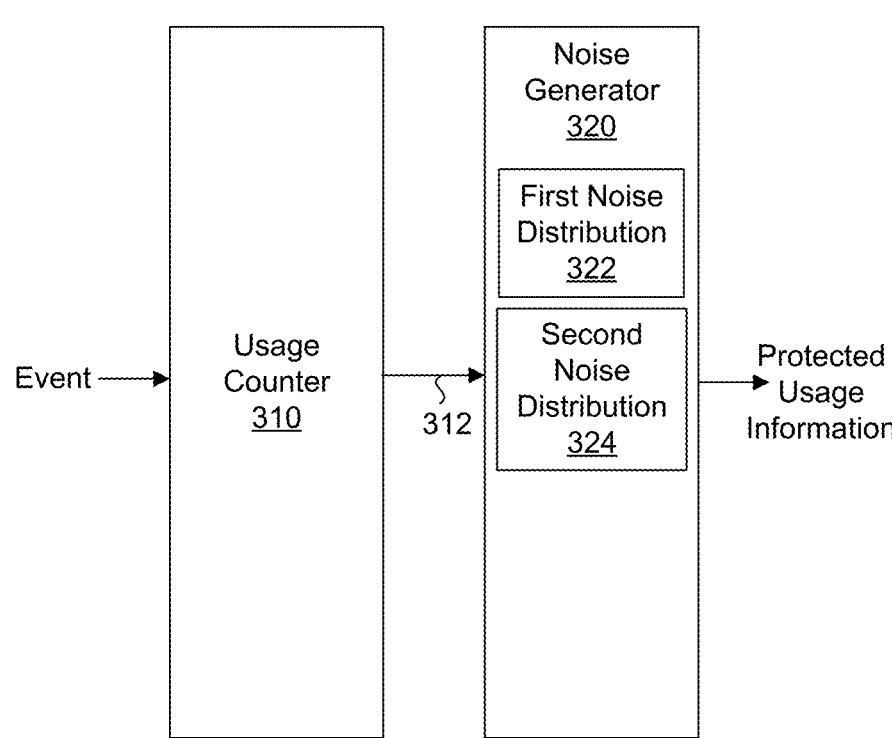
FIG. 3 is a conceptual diagram of a privacy generation system for protecting long-term privacy and short-term privacy, in accordance with some aspects of the disclosure.

FIG. 3 is a conceptual diagram of a privacy generation system 300 for protecting long-term privacy and short-term privacy in accordance with some aspects of the disclosure. In some aspects, the privacy generation system 300 is integral to a computing device (e.g., including the computing system 1000 of FIG. 10) and includes a usage counter 310 and a noise generator 320. The computing system can integrated into various electronic devices, such as a mobile phone, a digital watch, a digital media player, a computer, a tablet, an XR headset, a head unit of an automotive vehicle, an e-bike, and so forth.

The usage counter 310 is configured to receive events (e.g., for creating various usage counters or other metrics) from various sources of the computing system and generate usage information, which is sensitive user information. Non-limiting examples of events include usage of generative AI or other ML component that uses particular hardware resources as part of an application, capturing an image, using a multimedia filter in an application (e.g., audio, video), and so forth. The usage information represents the usage of a function of the device and it is associated with a duration of time. The duration of time can vary based on the purpose of collecting the usage information. For example, a device manufacturer may want to collect information pertaining to an application to ensure that the application has not been compromised, identify the performance of a new function that uses a neural net, usage information pertaining to wireless network performance, and so forth. In some cases, the usage information of the application may be more granular and the time unit is a single minute. In the case of usage information of a function such as a camera, the usage information may be in 24-hour intervals. The usage counter 310 is configured to output usage information 312 to the noise generator 320 for inserting noise that ambiguates short-term trends and long-term trends.

The noise generator 320 includes a first noise distribution 322 and a second noise distribution 324. In some aspects, the noise generator 320 is configured to generate a first noise from the first noise distribution 322 and a second noise from the second noise distribution 324 and apply the first noise and the second noise to the usage information. In some cases, the noise generator 320 can include a first noise source that is configured to generate the first noise distribution 322 and can include a second noise source that is configured to generate the second noise distribution 324. The first noise distribution 322 is a random noise and configured to disambiguate short-term trends based on an individual device of a user. For instance, the noise generator 320 (e.g., the first noise source) can generate a new random variable each time a new sample is reported from the usage counter 310. The random variables generated from the noise generator 320 are uncorrelated to the other samples generated from the noise generator 320. The second noise distribution 324 is a noise associated with a crowd distribution that is configured to disambiguate long-term trends based on crowd statistics. The second noise distribution 324 can be configured based on crowd statistics determined by a server that receives the usage data. For instance, the noise generator 320 (e.g., the second noise source) can randomly generate the second noise distribution, which can be persistent a long duration of time. In one example, with the exception of an initialization interval (e.g., a first interval 510 illustrated in FIG. 5), the noise generator 320 (e.g., the second noise source) may always generate a same number, which is randomly generated after the initialization interval. After the initialization interval, the noise may remain fixed or unchanged for a long duration of time (e.g., for an entire time duration of data collection from the device). In some aspects, instead of generating the same number and using the number for the long duration of time, the second noise source can generate a series of random numbers that may be auto-correlated (e.g., highly auto-correlated).

In some aspects, using two separate noise distributions introduces variation in two dimensions and can protect privacy information for short-term trends and long-term trends. As noted previously, the second noise distribution is configured to represent statistics of a crowd distribution (e.g., a complete population of user devices). For example, a random number generator on an individual device can use information pertaining to the user devices in the crowd distribution and can generate noise based on dynamic behavior of the user devices in the crowd. In some aspects, the first noise is configured to represent the statistics of a single device. The first and second noises should not be correlated, which enables the noise to ambiguate both short-term and long-term trends and prevent individual identifying information and trends from being discernable.

The noise generator 320 adds a first noise from the first noise distribution 322 and the second noise from the second noise distribution 324 and outputs protected usage information.

In this case, the noise generator 320 is configured to add weighted random variables that are uncorrelated with each other and the noise may be represented by equation 4 below.

$$\epsilon_i = \lambda L_p + (1 - \lambda)L_{vi} \qquad \text{(Equaiton 4)}$$

$L_p$ represents a Laplacian random corresponding to a second noise for the user, $L_{vi}$ represents a first noise that is generated for each usage information, and $\lambda$ is a weighting

US 12,632,593 B2

13 factor. In this case, using Equation 1 and equation 4, the mean of the usage information, for a given user, across long term, is represented by equation 5 below.

$$T_r = T_a + \lambda L_p + (1 - \lambda)\mu \qquad \text{(Equation 5)}$$

In equation 5, $T_a$ is the actual mean of usage information and $\mu$ is the mean of the Laplace distribution associated with the second noise $L_{vi}$. The standard deviation $\sigma$ using the noise generator 320 is shown in equation 6.

$$\sigma = \frac{1}{n-1} \sum_{k=1}^{n} \left[ (T_a - T)^2 + \lambda^2 (L_p - \mu)^2 \right] \qquad \text{(Equation 6)}$$

Equations 5 and 6 show that the noise generator 320 the mean value is a random variable having a mean of $T_a+(1-\lambda)\mu$ and the standard deviation corresponds to the weighted sum of two standard deviations. In some aspects, to ensure that the long-term trend of any user is protected and two users cannot be distinguished from each other, the standard deviation should be large, and of the same order of the standard deviation of an entire population.

Figure 4:
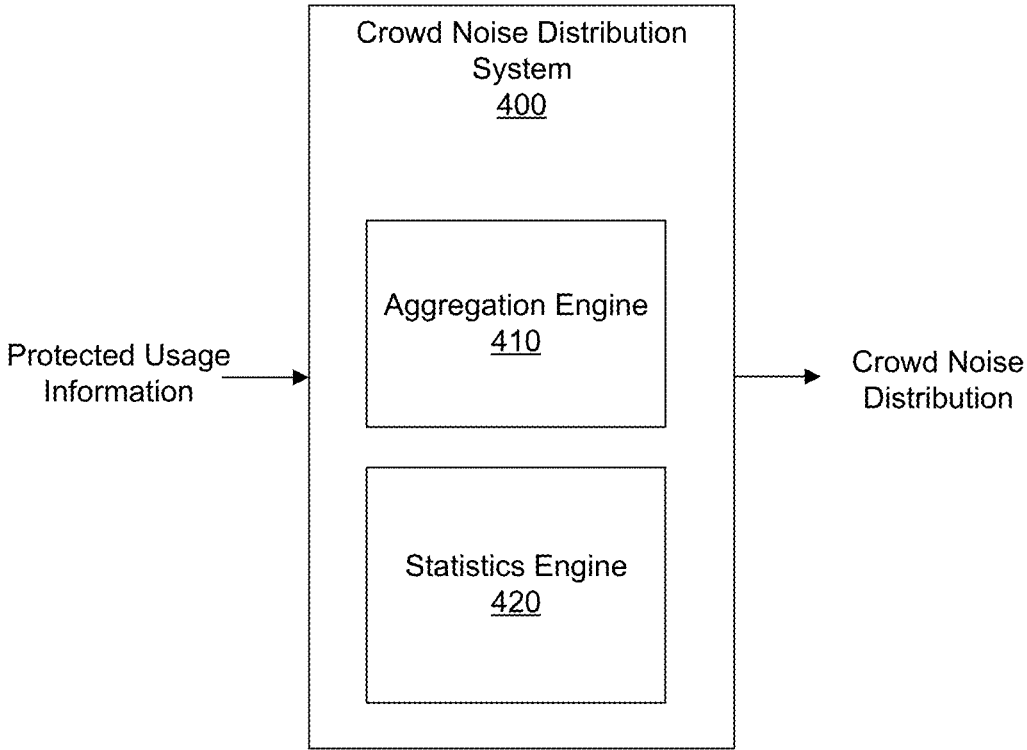
FIG. 4 is a conceptual illustration of a crowd noise distribution system for generating crowd-based statistics, in accordance with some aspects of the disclosure.

FIG. 4 is a conceptual illustration of a crowd noise distribution system 400 for generating crowd-based statistics in accordance with some aspects of the disclosure. In some aspects, the crowd noise distribution system 400 is configured to receive protected user information (e.g., usage information combined with noise) and generate a crowd noise distribution.

The crowd noise distribution system 400 includes an aggregation engine 410 configured to combine the protected usage information of each user into an aggregated dataset. The aggregated dataset represents usage of a function aggregated over all the users of the electronic device. For example, the aggregated dataset may represent mean, median, and variance of the number of all images captured by all users on a single day. The aggregation engine 410 may be configured to generate a complex dataset over a period of time and can be configured to apply various techniques to improve the quality of the aggregated dataset. For example, the aggregation engine 410 may apply a sliding window average based on inflection points that can be detected (e.g., due to a new release of a feature or application).

The aggregated dataset is provided to a statistics engine 420 that computes a crowd noise distribution (also referred to herein as second noise) and various parameters associated with the aggregated dataset. Non-limiting examples of parameters include mean, standard deviation, symmetry, skewness, kurtosis, and so forth. The crowd noise distribution system 400 is configured to distribute the crowd noise distribution for various computing devices to generate second noise based on the crowd noise distribution. The second noise is correlated from the perspective of data generated by a single device over time. However, when observed across multiple different user devices, the second noise is uncorrelated based on the source of the second noise at the different devices essentially being independent random number generators running on the different user devices and the generated random numbers are not shared outside of each respective device. For example, as noted in the timeline in FIG. 5, the second noise (e.g., the crowd noise distribution) can be generated based on seeding the aggregated dataset with protected usage information without using the

Figure 5:
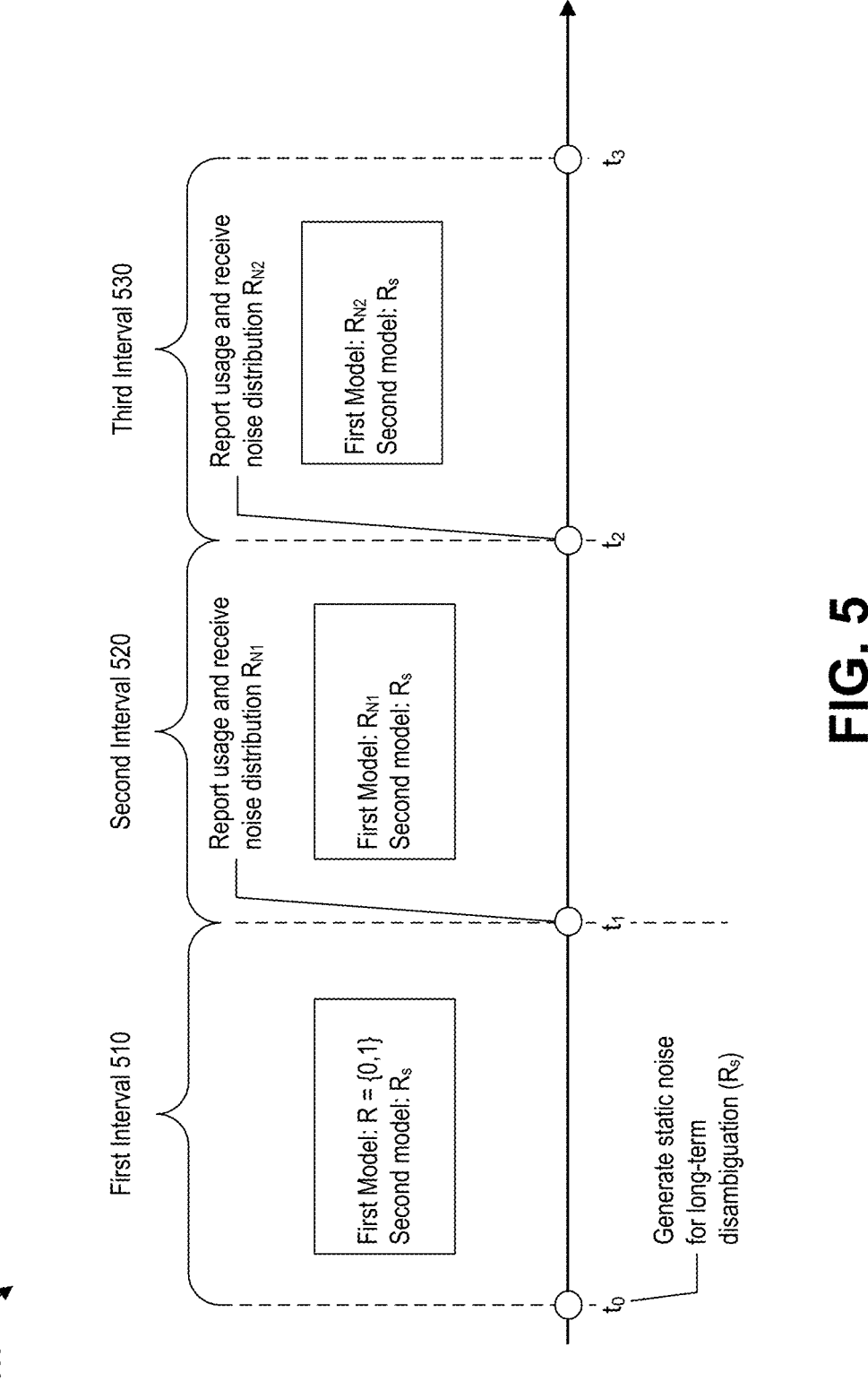
FIG. 5 is a timeline illustrating generation and distribution of a crowd-based noise distribution for protecting usage information, in accordance with some aspects of the disclosure.

14 second noise for an initial period (e.g., the first interval 510 of FIG. 5 discussed herein). After the aggregated dataset is seeded with a single interval of data, the crowd noise distribution system 400 can then distribute the second noise (e.g., the crowd noise distribution).

FIG. 5 is a timeline 500 illustrating generation and distribution of a crowd-based noise distribution (the second noise) for protecting usage information in accordance with some aspects of the disclosure. For example, a computing device that implements the privacy generation system (e.g., the privacy generation system 300 of FIG. 3) may perform the actions described in the timeline 500.

In some aspects, as previously described, the computing device is configured to apply a first noise distribution and a second noise distribution to protect usage information of the user. At time to illustrated in FIG. 5, the computing device generates a random noise $R_s$ for the first noise. At time to, the computing device may be unable to generate a second noise associated with a crowd distribution at the device. For example, the second noise associated with the crowd distribution may be unavailable during the first interval 510 because the crowd usage information may be initially unavailable. The computing device may use a noise distribution that is associated with a random noise R={0, 1} as a placeholder noise for the second noise during the first interval 510.

At time $t_1$, the computing device reports protected usage information to a crowd noise distribution system (e.g., the crowd noise distribution system 400 of FIG. 4) and receives a noise distribution noise distribution $R_{N1}$. In this case, the noise distribution noise distribution $R_{N1}$ is associated with a crowd and includes various information that enables a privacy generation system to generate noise that is correlated to the crowd that is different from the first model. For the duration of the second interval 520, the computing device uses the noise distribution noise distribution $R_{N1}$ and the random noise.

At time $t_2$, the computing device reports protected usage information to a crowd noise distribution system and receives an updated noise distribution $R_{N2}$ based on updated crowd statistics. In this case, the crowd noise distribution system adjusts the noise distribution based on crowd usage to provide updated noise distributions that represent current trends based on changes in usage. In some cases, the updated noise distribution $R_{N2}$ can be provided over long periods of time in order to protect against long-term behavior of a user via a user device of the user. The computing device uses the updated noise distribution $R_{N2}$ and the second noise $R_S$ for the third duration 530, which then reports the usage information as described above and receives an updated noise distribution. This process continues and causes the noise distribution at the computing device to use a noise distribution that represents the current usage of the crowd. In other aspects, the techniques described above can also be applied to other types of sensitive information.

Figure 6:
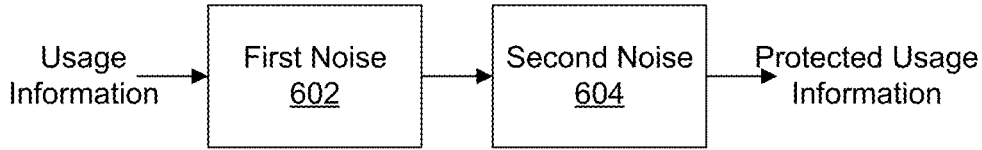
FIG. 6 is a conceptual illustration of a sample of usage information that is modified with different types of noise (e.g., first noise and second noise) to generate protected usage information, in accordance with some aspects of the disclosure.

FIG. 6 is a conceptual illustration of a sample of usage information that is modified with a first noise and second noise to generate protected usage information in accordance with some aspects of the disclosure.

In some aspects, the usage information is associated with usage of a function or a device of the computing device. Non-limiting examples of usage information include the duration a user played a game, the duration a user watched media, the volume of usage of a processing core of an SoC, the volume of usage of an NNPU, etc. In this case, a first noise 602 is added to the usage information. The first noise 602 is associated with an individual device and will shift the usage information on a regular interval to obscure short-term trends.

An second noise 604 is also added to the usage information. The second noise 604 is associated with average crowd usage. The average crowd usage changes over long-term periods and can be used to obscure long-term trends within the usage information. By adding the first noise 602 and the second noise 604 to the usage information, the usage information is transformed into protected usage information that obscures both short-term trends and long-term trends of usage of the function by the user.

In some aspects, the first noise 602 and the second noise 604 can be generated and applied at different devices for varying purposes. For example, the first noise 602 and the second noise 604 can be applied at a usage server that receives the usage information. In another example, the first noise 602 can be generated and applied at the user device and transmitted to a usage server, and the usage server can generate and apply the second noise 604. In other cases, the second noise 604 can be generated and applied at the user device and the first noise 602 can be generated and applied at the usage server. The different aspects can have different benefits, for example, privacy conscious users may prefer to disambiguate data at the local device. In the event that the second noise 604 is applied to the usage information at the server, the user device may not need to receive the second noise distribution associated with the crowd.

Figure 7:
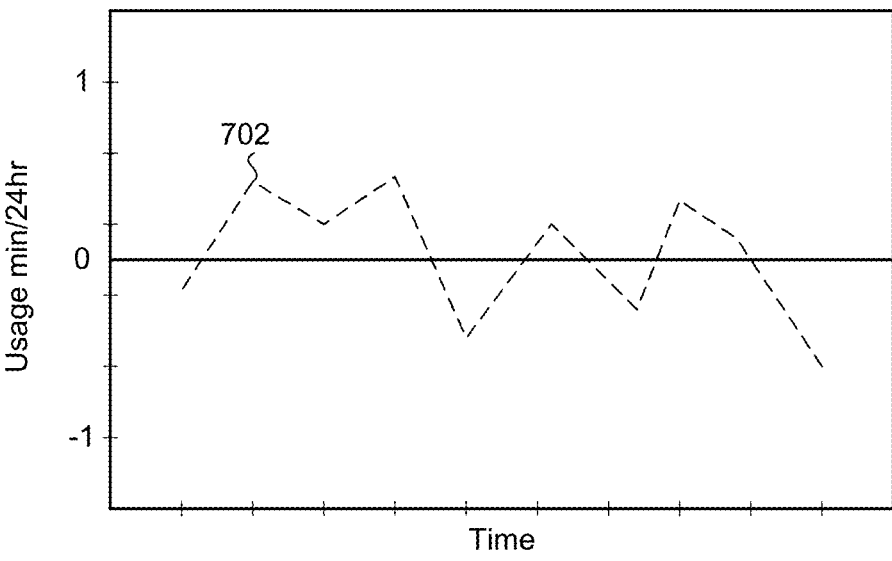
FIG. 7 is a conceptual illustration of another technique for generating noise (second noise) associated with a crowd distribution, in accordance with some aspects of the disclosure.

FIG. 7 is a conceptual illustration of another technique for generating an uncorrelated noise in accordance with some aspects of the disclosure. In some aspects, an uncorrelated noise can be generated based on a random walk function, which is a running value that is based on a previous value. For example, the running value is based on the previous running value and a current random value. In this case, the running value can be applied to usage information to obscure the usage information. The mean value of the running value will be zero over a long term because there is an equal chance that the random number will be positive and negative. In some aspects, the noise associated with the random walk can be generated using the uncorrelated noise of the crowd statistics to further obscure the sensitive user information.

FIG. 8 is a flowchart illustrating an example method for protecting usage information for long-term privacy and short-term privacy in accordance with aspects of the present disclosure. The process 800 can be performed by a computing device having an image sensor, such as a mobile wireless communication device, a vehicle (e.g., an autonomous or semi-autonomous vehicle, a wireless-enabled vehicle, and/ or other type of vehicle) or computing device or system of the vehicle, a robot device or system (e.g., for residential or manufacturing purposes), a camera, an XR device, or another computing device. In one illustrative example, a computing system (e.g., computing system 1000) can be configured to perform all or part of the process 800. In one illustrative example, the SoC 100 can be configured to perform all or part of the process 800. For instance, the computing system 1000 may include the components of the SoC 100 and can be configured to perform all or part of the process 800.

Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, a computing system (e.g., the computing system 1000) may detect, over a period of time, a plurality of events associated with a function of the computing device. In some aspects, the plurality of events can be associated with a hardware component of the computing system. For example, the event can be executing the camera function. However, the event can be any event that invokes a hardware function and usage of that hardware function can be recorded to assist in determining usage statistics of that hardware function. For example, the hardware function can be execution of a generative AI model that invokes specialized hardware within the computing system (e.g., an NNPU, a GPU, etc.) and measures usage. For example, compute time of the NNPU can be recorded based on an application that is executing in the computing system.

At block 804, the computing system may determine a first noise associated with the plurality of events over the period of time. In some aspects, the first noise is representative of a random or static variable associated with the computing system.

In one aspect, the computing system may, to determine the first noise, determine a first random value and add the first random value to a previous random value to generate the first noise. For example, in the second aspect, the computing system implements a random walk to vary the first noise over periods of time. In another aspect, the first noise may be a random number that is selected by the computing device. The first noise may be fixed for a long period to disambiguate long-term trends (e.g., over a year).

At block 806, the computing system may add the first noise and a second noise to a value corresponding to the plurality of events. In some aspects, the first noise and the second noise are configured to disambiguate regular usage of the function and irregular usage of the function. For example, regular usage is associated with the function of the computing system. For example, the number of images captured in a day. Other events may have a different range. For example, regular usage of a heart rate monitor function may be associated with minutes or hours. Irregular usage corresponds to behavior that is different than the regular usage due to activity that is different than normal behavior based on the period of time. An example of irregular usage of a camera function may occur during a vacation. In another example, irregular usage of a heart rate monitor function may be associated with a workout, or a hike that occurs on vacation.

The second noise is associated with the function of the computing device and is added to reports identifying the usage of the function. For example, the second noise is associated with crowd statistics based on an analysis performed at (or for) the device usage server.

In some aspects, the computing system may receive a second noise distribution from the device usage service, and the second noise is generated at the computing device based on the second noise distribution. The second noise distribution is based on a statistical analysis of other computing devices reporting corresponding events associated with the function of the computing device over a previous period of time.

In some cases, the second noise distribution may not be available because other computing devices have not yet reported corresponding events associated with the function. The computing system may an detect an initial plurality of events associated with the function of the computing device over a previous period of time. The computing system may add a random noise to information associated with the initial plurality of events and send the information including the random noise to the device usage service. The information associated with the initial plurality of events may be disambiguated using the random noise for the period during which the second noise distribution is unavailable.

At block 808, the computing system may send a noisy report identifying a usage of the function to a device usage service. In one aspect, the noisy report may include the value with the first noise and the second noise.

In some aspect, the second noise distribution may evolve over time. In this case, the crowd statistics can change and the computing system can be updated with a revised noise model. For example, the computing system may detect a subsequent plurality of events in a subsequent period of time associated with the function of the computing device. The computing system may add a third noise to a value associated with the subsequent plurality of events, wherein the third noise is associated with a first noise distribution

In some aspects, the second noise can be added differently. For example, the device usage service may add generate and add the noise before while removing any personally identifiable information to anonymize the data. The computing device may include a privacy setting pertaining to how the noise is applied and a user can configure the desired privacy level when reporting data. For example, a user interface may present a usage disambiguation option that allows local usage disambiguation (e.g., applying the first noise and the second noise at the computing device) or mixed device disambiguation (e.g., applying the first noise at the computing device and applying the second noise at the device usage service).

Figure 9:
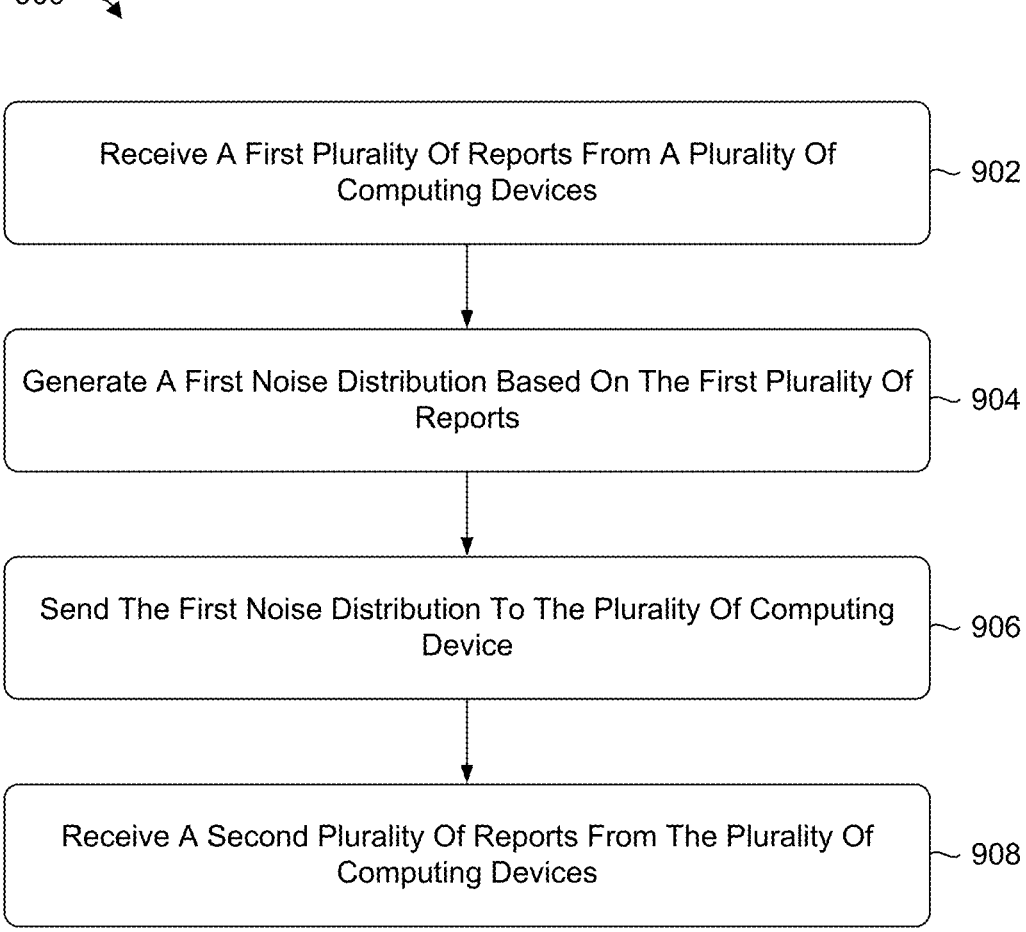
FIG. 9 is a flowchart illustrating an example method for generating a noise distribution for generating a noise distribution (second noise) for long-term privacy and short-term privacy, in accordance with aspects of the present disclosure.

FIG. 9 is a flowchart illustrating an example of a process 900 for generating a noise distribution for generating an uncorrelated noise distribution for long-term privacy and short-term privacy in accordance with aspects of the present disclosure. The process 900 can be performed by a computing device having an image sensor, such as a mobile wireless communication device, a vehicle (e.g., an autonomous or semi-autonomous vehicle, a wireless-enabled vehicle, and/ or other type of vehicle) or computing device or system of the vehicle, a CV robot function (e.g., manufacturing), a camera, an XR device, or another computing device. In one illustrative example, a computing system (e.g., computing system 1000) can be configured to perform all or part of the process 900. In one illustrative example, the SoC 100 can be configured to perform all or part of the process 900. For instance, the computing system 1000 may include the components of the SoC 100 and can be configured to perform all or part of the process 900.

At block 902, a computing system (e.g., the computing system 1000) may receive a first plurality of reports from a plurality of computing devices. The first plurality of reports includes values identifying usage of a function at a corresponding computing device combined with a first random noise value generated at the corresponding computing device.

At block 904, the computing system may generate a first noise distribution based on the first plurality of reports. At block 906, the computing system may send the first noise distribution to the plurality of computing devices.

At block 908, the computing system may receive a second plurality of reports from the plurality of computing devices. The second plurality of reports include values identifying usage of the function at the corresponding computing device combined with a second random noise value generated at the corresponding computing device based on the first noise distribution. The second random noise value includes a first noise associated with the first noise distribution and a second noise generated based on a different noise distribution.

The computing system may continue to generate a second noise distribution based on the second plurality of reports and send the second noise distribution to the plurality of computing devices. In this case, the computing system is configured to build a model that represents statistical usage of a particular function associated with the plurality of computing devices and enable each computing device to disambiguate usage data to protect for short-term usage and long-term usage. For example, short-term usage corresponds to irregular usage (e.g., a vacation) and long-term usage corresponds to regular usage.

In some examples, the processes or methods described herein (e.g., process 800, the process 900, and/or other method described herein) may be performed by a computing device or apparatus. In one example, the process 800 and/or the process 900 can be performed by a computing device (e.g., the SoC 100 in FIG. 1) having a computing architecture of the computing system 1000 shown in FIG. 10.

The processes 800 and 900 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The processes 800 and 900, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
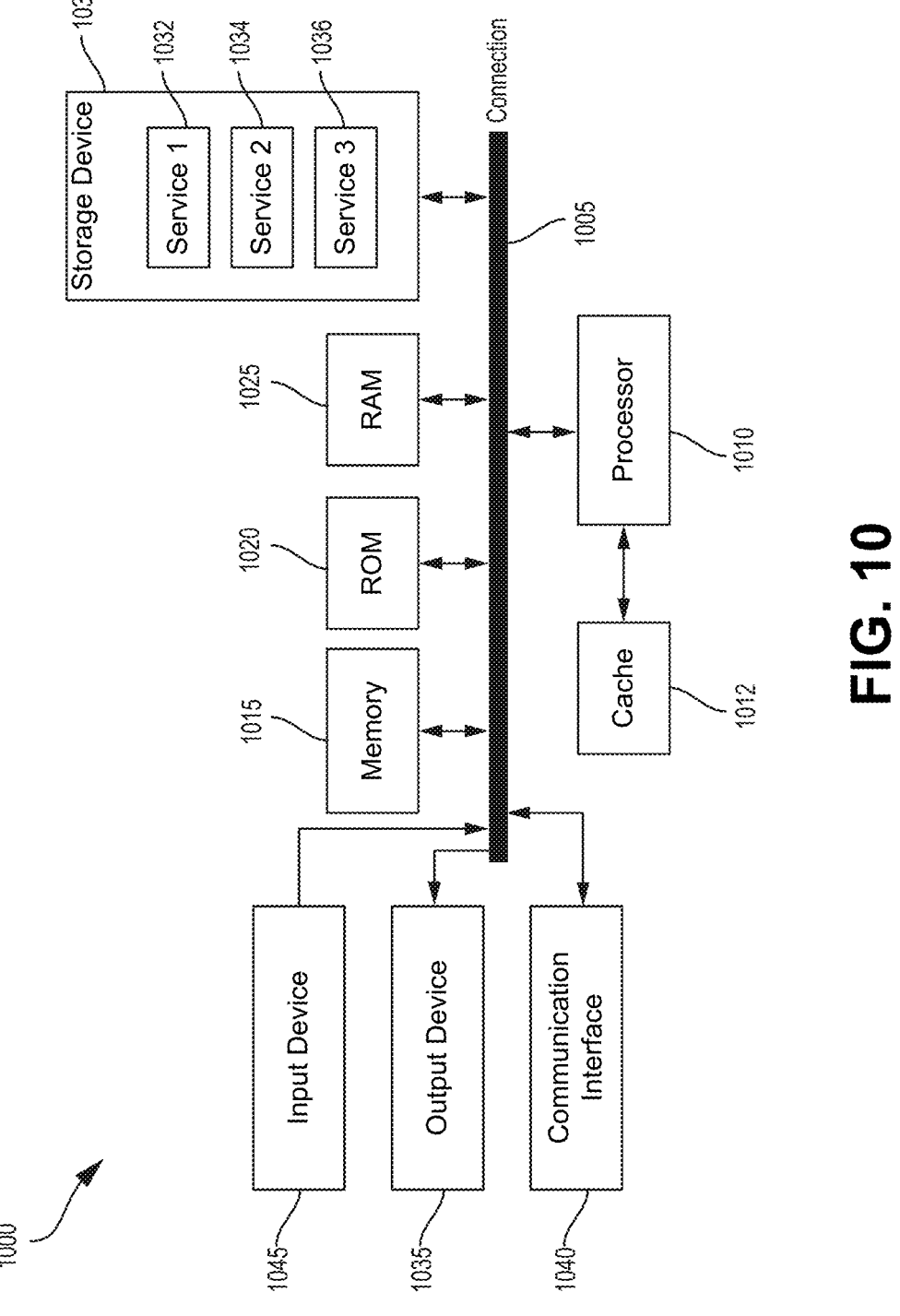
FIG. 10 is a diagram illustrating an example of a system for implementing certain aspects described herein.

FIG. 10 is a diagram illustrating an example of a computing system 1000 that can implement certain aspects of the systems and techniques described herein. The computing system 1000 can be, for example, any computing device making up internal computing system, a remote computing system, or any component thereof in which the components of the system 1000 are in communication with each other using connection 1005. Connection 1005 can be a physical connection using a bus, or a direct connection into processor 1010, such as in a chipset (e.g., SoC) architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1000 includes at least one processing unit (CPU or processor) 1010 and connection 1005 that couples various system components including system memory 1015, such as ROM 1020 and RAM 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the methods described herein (e.g., process 800, method 900, and/or other process described herein) may be performed by a computing device or apparatus. In one example, the method 700 can be performed by a computing device (e.g., the SoC 100 in FIG. 1) having a computing architecture of the computing system 1000 shown in FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the present disclosure include:

Aspect 1. A method of reporting privacy-protected usage of a computing device, the method comprising: detecting, over a period of time, a plurality of events associated with a function of the computing device; determining a first noise associated with the plurality of events over the period of time; adding the first noise and a second noise to a value corresponding to the plurality of events; and sending a noisy report identifying a usage of the function to a device usage service, the noisy report including the value with the first noise and the second noise.

Aspect 2. The method of Aspect 1, further comprising: receiving a second noise distribution from the device usage service, wherein the second noise is generated based on the second noise distribution.

Aspect 3. The method of any of Aspects 1 to 2, wherein the second noise distribution is based on a statistical analysis of other computing devices reporting corresponding events associated with the function of the computing device over a previous period of time.

Aspect 4. The method of any of Aspects 1 to 3, further comprising: detecting an initial plurality of events associated with the function of the computing device over a previous period of time, the previous period of time occurring prior to the period of time; adding a random noise to information associated with the initial plurality of events; and sending the information including the random noise to the device usage service.

Aspect 5. The method of any of Aspects 1 to 4, further comprising: detecting a subsequent plurality of events in a subsequent period of time associated with the function of the computing device, the subsequent period of time occurring after the period of time; and adding a third noise to a value associated with the subsequent plurality of events, wherein the third noise is associated with a first noise distribution.

Aspect 6. The method of any of Aspects 1 to 5, wherein the first noise and the second noise are configured to disambiguate regular usage of the function and irregular usage of the function.

Aspect 7. The method of any of Aspects 1 to 6, wherein determining the first noise associated with the plurality of events over the period of time comprises: determining a first random value; and adding the first random value to a previous random value to generate the first noise.

Aspect 8. The method of any of Aspects 1 to 7, wherein the second noise is associated with the function of the computing device and is added to reports identifying the usage of the function.

Aspect 9. The method of any of Aspects 1 to 8, wherein the second noise is independent of the first noise.

Aspect 10. A method of distributing noise models to anonymize reporting data, the method comprising: receiving a first plurality of reports from a plurality of computing devices, wherein the first plurality of reports include values identifying usage of a function at a corresponding computing device combined with a first random noise value generated at the corresponding computing device; generating a first noise distribution based on the first plurality of reports; sending the first noise distribution to the plurality of computing devices; and receiving a second plurality of reports from the plurality of computing devices, wherein the second plurality of reports include values identifying usage of the function at the corresponding computing device combined with a second random noise value generated at the corresponding computing device based on the first noise distribution.

Aspect 11. The method of Aspect 10, further comprising: generating a second noise distribution based on the second plurality of reports; and sending the second noise distribution to the plurality of computing devices.

Aspect 12. The method of any of Aspects 10 to 11, wherein the second random noise value includes a first noise associated with the first noise distribution and a second noise generated based on a different noise distribution.

Aspect 13. An apparatus for reporting privacy-protected usage information. The apparatus includes at least one memory and at least one processor coupled to the at least one memory. The at least one processor is configured to: detect, over a period of time, a plurality of events associated with a function of the apparatus; determine a first noise associated with the plurality of events over the period of time; add the first noise and a second noise to a value corresponding to the plurality of events; and send a noisy report identifying a usage of the function to a device usage service, the noisy report including the value with the first noise and the second noise.

Aspect 14. The apparatus of Aspect 13, wherein the at least one processor is configured to: receive a second noise distribution from the device usage service, wherein the second noise is generated based on the second noise distribution.

Aspect 15. The apparatus of any of Aspects 13 to 14, wherein the second noise distribution is based on a statistical analysis of other apparatus reporting corresponding events associated with the function of the apparatus over a previous period of time.

Aspect 16. The apparatus of any of Aspects 13 to 15, wherein the at least one processor is configured to: detect an initial plurality of events associated with the function of the apparatus over a previous period of time, the previous period of time occurring prior to the period of time; add a random noise to information associated with the initial plurality of events; and send the information including the random noise to the device usage service.

Aspect 17. The apparatus of any of Aspects 13 to 16, wherein the at least one processor is configured to: detect a subsequent plurality of events in a subsequent period of time associated with the function of the apparatus, the subsequent period of time occurring after the period of time; and add a third noise to a value associated with the subsequent plurality of events, wherein the third noise is associated with a first noise distribution.

Aspect 18. The apparatus of any of Aspects 13 to 17, wherein the first noise and the second noise are configured to disambiguate regular usage of the function and irregular usage of the function.

Aspect 19. The apparatus of any of Aspects 13 to 18, wherein the at least one processor is configured to: determine a first random value; and add the first random value to a previous random value to generate the first noise.

Aspect 20. The apparatus of any of Aspects 13 to 19, wherein the second noise is associated with the function of the apparatus and is added to reports identifying the usage of the function.

Aspect 21. The apparatus of any of Aspects 13 to 20, wherein the second noise is independent of the first noise.

Aspect 22. An apparatus for distributing noise models to anonymize reporting data. The apparatus includes at least one memory and at least one processor coupled to the at least one memory. The at least one processor is configured to: receive a first plurality of reports from a plurality of computing devices, wherein the first plurality of reports include values identifying usage of a function at a corresponding computing device combined with a first random noise value generated at the corresponding computing device; generate a first noise distribution based on the first plurality of reports; send the first noise distribution to the plurality of computing devices; and receive a second plurality of reports from the plurality of computing devices, wherein the second plurality of reports include values identifying usage of the function at the corresponding computing device combined with a second random noise value generated at the corresponding computing device based on the first noise distribution.

Aspect 23. The apparatus of Aspect 22, wherein the at least one processor is configured to: generate a second noise distribution based on the second plurality of reports; and send the second noise distribution to the plurality of computing devices.

Aspect 24. The apparatus of any of Aspects 22 to 23, wherein the second random noise value includes a first noise associated with the first noise distribution and a second noise generated based on a different noise distribution.

Aspect 25. A method of reporting privacy-protected usage, the method comprising: detecting, over a period of time, a plurality of events associated with a function of the computing device; determining a first noise associated with the plurality of events over the period of time, wherein the first noise is associated with a first noise distribution; adding at least the first noise to a value corresponding to the plurality of events; and sending a noisy report identifying a usage of the function to a device usage service, the noisy report including the value associated with at least the first noise, wherein the device usage service is configured to add a second noise to the value in the noisy report, wherein the second noise is associated with a second noise distribution that is different from the first noise distribution.

Aspect 26. The method of Aspect 25, wherein a user privacy setting configures the computing device to selectively add the second noise at the device usage server or the computing device.

Aspect 27. The method of any of Aspects 25 to 26, wherein the first noise and the second noise are configured to disambiguate regular usage of the function and irregular usage of the function.

Aspect 28. An apparatus for reporting privacy-protected usage. The apparatus includes at least one memory and at least one processor coupled to the at least one memory. The at least one processor is configured to: detect, over a period of time, a plurality of events associated with a function of the computing device; determine a first noise associated with the plurality of events over the period of time, wherein the first noise is associated with a first noise distribution; add at least the first noise to a value corresponding to the plurality of events; and send a noisy report identifying a usage of the function to a device usage service, the noisy report including the value associated with at least the first noise, wherein the device usage service is configured to add a second noise to the value in the noisy report, wherein the second noise is associated with a second noise distribution that is different from the first noise distribution.

Aspect 29. The apparatus of Aspect 28, wherein a user privacy setting configures the computing device to selectively add the second noise at the device usage server or the computing device.

Aspect 30. The apparatus of any of Aspects 28 to 29, wherein the first noise and the second noise are configured to disambiguate regular usage of the function and irregular usage of the function.

Aspect 31. A non-transitory computer-readable medium having stored thereon instructions that, when executed by one or more processors, cause the one or more processors to perform operations according to any of Aspects 1 to 9.

Aspect 32. An apparatus including one or more means for performing operations according to any of Aspects 1 to 9.

Aspect 33. A non-transitory computer-readable medium having stored thereon instructions that, when executed by one or more processors, cause the one or more processors to perform operations according to any of Aspects 10 to 12.

Aspect 34. An apparatus for generating virtual content in a distributed system, the apparatus including one or more means for performing operations according to any of Aspects 10 to 12.

Aspect 35. A non-transitory computer-readable medium having stored thereon instructions that, when executed by one or more processors, cause the one or more processors to perform operations according to any of Aspects 25 to 27.

Aspect 36. An apparatus for generating virtual content in a distributed system, the apparatus including one or more means for performing operations according to any of Aspects 25 to 27.

What is claimed is:

1. A method of reporting usage of a computing device, the method comprising:

detecting, over a period of time, a plurality of events associated with a function of the computing device;

determining a first noise associated with the plurality of events over the period of time;

adding the first noise and a second noise to a value corresponding to the plurality of events, wherein the second noise is independent of the first noise; and sending a noisy report identifying a usage of the function to a device usage service, the noisy report including the value with the first noise and the second noise.

2. The method of claim 1, further comprising:

receiving a second noise distribution from the device usage service, wherein the second noise is generated based on the second noise distribution.

3. The method of claim 2, wherein the second noise distribution is based on a statistical analysis of other computing devices reporting corresponding events associated with the function of the computing device over a previous period of time.

4. The method of claim 1, further comprising:

detecting an initial plurality of events associated with the function of the computing device over a previous period of time, the previous period of time occurring prior to the period of time;

adding a random noise to information associated with the initial plurality of events; and sending the information including the random noise to the device usage service.

5. The method of claim 1, further comprising:

detecting a subsequent plurality of events in a subsequent period of time associated with the function of the computing device, the subsequent period of time occurring after the period of time; and adding a third noise to a value associated with the subsequent plurality of events, wherein the third noise is associated with a first noise distribution.

6. The method of claim 1, wherein the first noise and the second noise are configured to disambiguate regular usage of the function and irregular usage of the function.

7. The method of claim 1, wherein determining the first noise associated with the plurality of events over the period of time comprises:

determining a first random value; and adding the first random value to a previous random value to generate the first noise.

8. The method of claim 1, wherein the second noise is associated with the function of the computing device and is added to reports identifying the usage of the function.

9. A method of distributing noise models to anonymize reporting data, the method comprising:

receiving a first plurality of reports from a plurality of computing devices, wherein the first plurality of reports include values identifying usage of a function at a corresponding computing device combined with a first random noise value generated at the corresponding computing device;

generating a first noise distribution based on the first plurality of reports;

sending the first noise distribution to the plurality of computing devices; and receiving a second plurality of reports from the plurality of computing devices, wherein the second plurality of reports include values identifying usage of the function at the corresponding computing device combined with a second random noise value generated at the corresponding computing device based on the first noise distribution.

10. The method of claim 9, further comprising:

generating a second noise distribution based on the second plurality of reports; and sending the second noise distribution to the plurality of computing devices.

11. The method of claim 9, wherein the second random noise value includes a first noise associated with the first noise distribution and a second noise generated based on a different noise distribution.

12. An apparatus for receiving privacy-protected usage information, comprising:

at least one memory; and at least one processor coupled to the at least one memory and configured to:

detect, over a period of time, a plurality of events associated with a function of the apparatus;

determine a first noise associated with the plurality of events over the period of time;

add the first noise and a second noise to a value corresponding to the plurality of events, wherein the second noise is independent of the first noise; and send a noisy report identifying a usage of the function to a device usage service, the noisy report including the value with the first noise and the second noise.

13. The apparatus of claim 12, wherein the at least one processor is configured to:

receive a second noise distribution from the device usage service, wherein the second noise is generated based on the second noise distribution.

14. The apparatus of claim 13, the second noise distribution is based on a statistical analysis of other computing devices reporting corresponding events associated with the function of the apparatus over a previous period of time.

15. The apparatus of claim 12, wherein the at least one processor is configured to:

detect an initial plurality of events associated with the function of the apparatus over a previous period of time, the previous period of time occurring prior to the period of time;

add a random noise to information associated with the initial plurality of events; and send the information including the random noise to the device usage service.

16. The apparatus of claim 12, wherein the at least one processor is configured to:

detect a subsequent plurality of events in a subsequent period of time associated with the function of the apparatus, the subsequent period of time occurring after the period of time; and add a third noise to a value associated with the subsequent plurality of events, wherein the third noise is associated with a first noise distribution.

17. The apparatus of claim 12, the first noise and the second noise are configured to disambiguate regular usage of the function and irregular usage of the function.

18. The apparatus of claim 12, wherein the at least one processor is configured to:

determine a first random value; and add the first random value to a previous random value to generate the first noise.

19. The apparatus of claim 12, the second noise is associated with the function of the apparatus and is added to reports identifying the usage of the function.

20. An apparatus for receiving privacy-protected usage information, comprising:

at least one memory; and at least one processor coupled to at least one memory and configured to:

receive a first plurality of reports from a plurality of computing devices, wherein the first plurality of reports include values identifying usage of a function at a corresponding computing device combined with a first random noise value generated at the corresponding computing device;

generate a first noise distribution based on the first plurality of reports;

send the first noise distribution to the plurality of computing devices; and receive a second plurality of reports from the plurality of computing devices, wherein the second plurality of reports include values identifying usage of the function at the corresponding computing device combined with a second random noise value generated at the corresponding computing device based on the first noise distribution.

21. The apparatus of claim 20, wherein the at least one processor is configured to:

generate a second noise distribution based on the second plurality of reports; and send the second noise distribution to the plurality of computing devices.

22. The apparatus of claim 20, the second random noise value includes a first noise associated with the first noise distribution and a second noise generated based on a different noise distribution.

* * * * *